United States Patent [19]

Roudebush, Jr.

[11] 4,125,827

[45] Nov. 14, 1978

[54] AUTOMATICALLY CANCELLING TURN SIGNAL

[76] Inventor: Robert D. Roudebush, Jr., Rt. #2, Box 214, Long Grove, Ill. 60047

[21] Appl. No.: 397,675

[22] Filed: Sep. 17, 1973

[51] Int. Cl.² ............................................. B60Q 1/34
[52] U.S. Cl. .................................. 340/73; 200/61.28; 200/61.88; 200/61.27; 340/52 R; 340/56; 340/134; 340/377
[58] Field of Search ........................ 340/73, 74, 75, 76, 340/52R, 56; 200/61.28, 61.88, 61.27, 16 C; 180/30, 34, 103, 105 R; 74/473, 474, 475, 478, 512, 514

[56] References Cited

U.S. PATENT DOCUMENTS

| 1,998,639 | 4/1935 | Roberts | 200/61.28 |
| 2,704,360 | 3/1955 | Werstein | 200/61.28 |
| 2,872,660 | 2/1959 | Ireland | 74/474 |
| 3,217,112 | 11/1965 | Campbell | 200/16 C |
| 3,484,743 | 12/1969 | Stancil | 200/61.27 |

Primary Examiner—John W. Caldwell, Sr.
Assistant Examiner—Donnie L. Crosland
Attorney, Agent, or Firm—Hosier, Niro & Daleiden, Ltd.

[57] ABSTRACT

The invention provides an automatic cancelling turn signal for a motorcycle or the like having a transmission with at least two forward speeds which operates by cancelling the turn signal in response to an upshift. The apparatus comprises left and right turn signal lights, switch means for selectively activating the left or right light, and inactivating means for inactivating the lights responsive to the shifting of the transmission from a lower gear to a higher gear. Means are also provided for including a four-way flasher in a turn signal system.

15 Claims, 8 Drawing Figures

U.S. Patent  Nov. 14, 1978  4,125,827
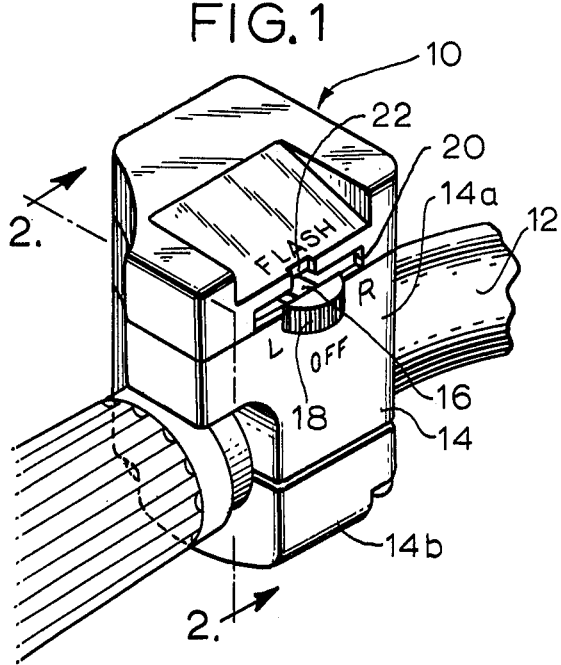
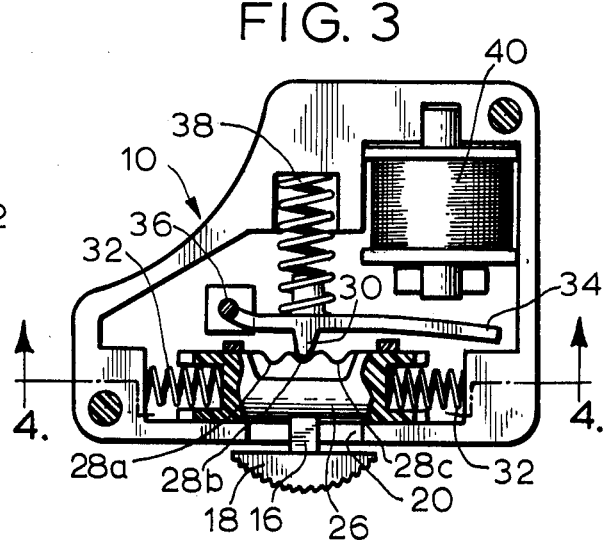
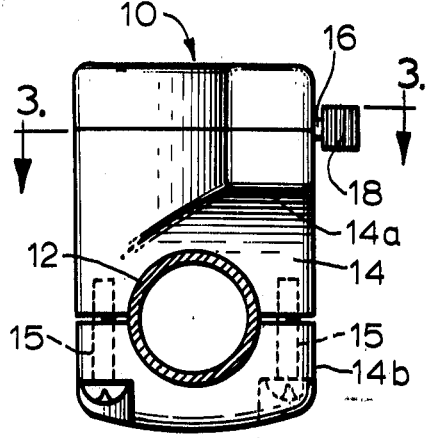
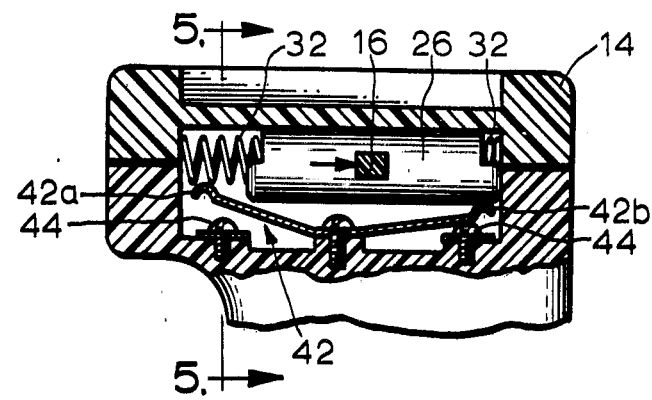
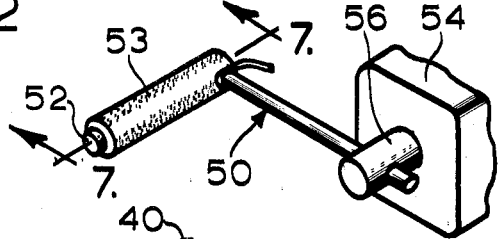
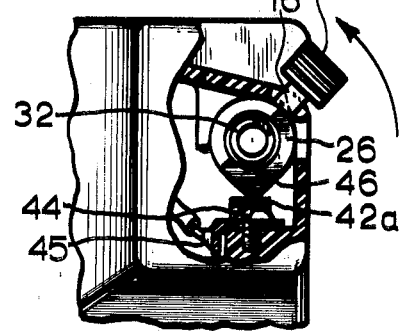
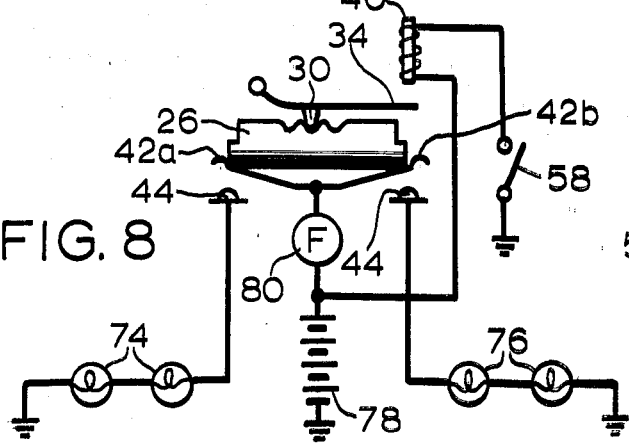
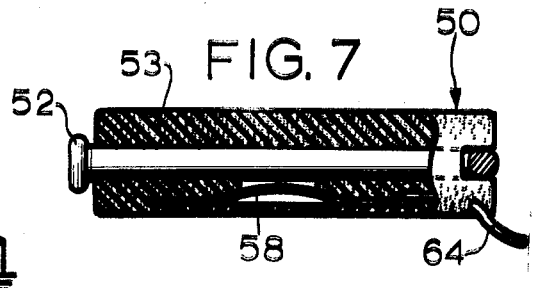

AUTOMATICALLY CANCELLING TURN SIGNAL

The present invention relates to an improved automatically cancelling turn signal, and more specifically to an improved automatically cancelling turn signal for a motorcycle or the like having a transmission with at least two forward speeds.

Self-cancelling turn signals have long been employed in automobiles, where the turn signal is cancelled by the turning of the steering wheel as the automobile emerges from the turn. While such a system can be satisfactorily employed for automobiles, turn signals are now being provided on other types of powered vehicles, particularly motorcycles, which have no steering wheel. Furthermore, when a motorcycle makes a turn, there is often relatively little turning of the handlebars involved, so that automatic cancellation of a turn signal in response to the turning of the handlebars or front wheel is impractical. As a result, although turn signals are becoming almost universal on motorcycles, such vehicles universally employ manually cancelling turn signals. In some instances, audible signals have been provided in order to alert the rider that a turn signal is operating, but such signals do not provide automatic cancellation. The safety disadvantages of a manually cancelling turn signal are obvious, as the rider of a motorcycle could easily find himself proceeding down the road with an operating turn signal of which he is unaware.

In accordance with the present invention, there is provided an automatically cancelling turn signal for a motorcycle or the like which operates in response to an upshift of the transmission. Ordinarily, when any vehicle rounds a corner, the transmission will be downshifted as the vehicle slows down to approach the corner, and will then upshift after the vehicle emerges from the turn. The upshift of the vehicle can therefore be used to provide a signal for the cancellation of the turn signal. While such a system can be used on virtually any motor vehicle having at least two forward speeds, and could even be used on vehicles having automatic transmissions, it is particularly adapted to use on motorcycles having manual transmissions. Since motorcycles are conventionally shifted by means of a foot-operated gear shift lever, the cancelling mechanism may ordinarily be easily connected to this lever.

Generally, the invention provides an automatically cancelling turn signal for a motorcycle or the like having a transmission with at least two forward speeds together with shift control means for shifting the transmission. Basically, the invention comprises conventional left and right turn indicator lights mounted on the motorcycle, together with first switch means for selectively manually activating the lights and inactivating means including second switch means operatively connected to the shift control means for inactivating the lights responsive to the operation of the transmission is shifted from a lower gear to a higher gear.

The invention, its construction and method of operation, together with the objects and advantages thereof, will be best understood by reference to the following detailed description taken in conjunction with the drawings, in which:

FIG. 1 is a perspective view of a turn signal flasher switch mounted on a motorcycle handlebar, the switch embodying the features of the present invention;

FIG. 2 is a plan view of the switch mechanism shown in FIG. 1, taken along line 2—2 of FIG. 1;

FIG. 3 is a cross-sectional view taken along line 3—3 of FIG. 2;

FIG. 4 is a cross-sectional view taken along line 4—4 of FIG. 3;

FIG. 5 is a cross-sectional view taken along line 5—5 of FIG. 4, and indicating the switch in the "emergency flasher" position;

FIG. 6 is a perspective view of a motorcycle gear shift lever having a switch mounted thereon in accordance with the present invention;

FIG. 7 is a cross-sectional view taken along line 7—7 of FIG. 6; and

FIG. 8 is a wiring diagram illustrating an embodiment of the present invention.

Referring to FIG. 1, a self-cancelling turn signal switch assembly, generally 10, embodying the features of the present invention is shown mounted on a motorcycle handlebar 12. The switch assembly 10 incorporates first switch means for selectively manually activating turn signal lights, together with inactivating means for inactivating the lights response to the operation of a second switch means which senses an upshift of the transmission, as hereinafter described. The switch assembly 10 comprises a housing 14 which is separated into an upper section 14a and lower section 14b, which are attached together with screws 15, as shown in FIG. 2. The upper and lower sections 14a, 14b, respectively, each have arcuate cut-out sections to fit the handlebar 12, as best shown in FIG. 2.

The turn signals are controlled by a thumb-operated lever 16 having an arcuate, knurled control surface 8 which permits easy movement of the lever 16 to the left or right by use of the thumb. Accordingly, the housing 14 has a horizontal slot 20 which permits horizontal movement of the lever 16. In the preferred embodiment shown, the housing 14 also has a vertical slot 22 intersecting the central portion of the horizontal slot 20. This vertical slot 22 permits the upward movement of the lever 16 when it is in the central position of the horizontal slot 20, in order to activate the four-way flashers as hereinafter described.

Referring to FIG. 3, it is seen that the thumb-operated lever is connected to a slide-type switch having a sliding member 26, which is slidable in a horizontal direction to the left and right. In the preferred embodiment, the sliding member is also rotatable about its horizontal axis, as shown in FIG. 5, in order to permit activation of the four-way flashers.

As shown in FIG. 3, the sliding member 26 has cammed detents 28a, 28b, 28c, together with a cam follower 30 engaging the detents 28. As can be seen in FIG. 3, the detents 28 define left, center (or "off") and right positions for the sliding member 26, the left position being defined by the right detent 28c, the center or "off" position by the center detent 28b, and the right position by the left detent 28a. The sliding member 26 is biased toward the center position by a pair of coil springs 32 mounted between the ends of the sliding member 26 and the interior of the housing 14.

The cam follower 30 is mounted on a lever 34 which is hinged at one end at a pin-type hinge 36. The cam follower 30 is biased by a spring 38 into engagement with the cammed detents 28. As shown in FIG. 3, the housing 14 also contains an electromagnet 40 which can be activated in order to move the cam follower 30 out of engagement with the detents 28. In the embodiment shown, when the electromagnet 40 is activated, the lever 34 is drawn into contact with the electromagnet 40, thus moving the cam follower 30 out of engagement with the detents 28. Of course, the lever 34 must be made of a suitable ferromagnetic material.

In FIG. 4, the sliding member 26 is shown in its right position, as would be employed to engage a signal for a right-hand turn. Movement of the sliding member 26 to the left or right engages a leaf switch 42 having left and right leaves 42a, 42b, respectively, with contacts 44, in order to complete a circuit and activate the turn indicator lights. As shown in FIGS. 4 and 5, the contacts 44 are suitably insulated from the housing 14, and are connected to wires 45 in order to complete a circuit. In the center position, as shown in FIG. 3, the leaf switch 42 is not engaged with either contact, and the turn signals are therefore off.

Referring to FIG. 5, it is seen that the sliding member 26 also has a cammed surface portion 46 projecting radially outwardly from its horizontal axis. This cammed portion 46 permits the simultaneous engagement of both leaves 42a, 42b, with their associated contacts 44 by movement of the thumb-operated lever 16 in an upward direction when the sliding member 26 is in its center position. This simultaneous engagement of the left and right leaves 42a, 42b, respectively, permits the use of the turn indicators as a four-way emergency flasher.

FIG. 6 shows a conventional, generally L-shaped motorcycle foot-operated gearshift lever generally 50 having a toe-contact portion 52, which includes a rubber pad 53. The gearshift lever 50 is connected to the motorcycle transmission housing 54 via a shaft 56, which operates the gear-change mechanism. In the embodiment shown, the apparatus of the present invention is mounted for use on a motorcycle in which upshift is accomplished by an upward movement of the gearshift lever 50 by contacting the bottom of the toe-contact portion 52 with the foot. However, many motorcycles have an opposite shift pattern, wherein upshifting is accomplished by downward pressure on the toe-contact portion 52, and it will be appreciated that the present invention can be equally well adapted to such a shift pattern. Similarly, in some instances the gearshift lever is mounted on the right-hand side of the motorcycle instead of the left-hand side as shown. Obviously, the present invention is equally well adapted to such mounting.

Referring to FIG. 7, the electromagnet 40 is activated by upshifting the motorcycle, in this instance by upward movement of the lever 50 as accomplished by toe-contact with the underside of the toe-contact portion 52. As shown in FIG. 7, such contact completes a circuit by engaging a second switch means, in this instance a contact strip 58 embedded in the rubber pad 53, which is moved into contact with the metal toe contact portion 52 of the lever 50. Such contact with the metal lever 50 completes a circuit between a wire 64 and ground, as indicated by the referenced numeral 58 in the wiring diagram in FIG. 8, where the contact is shown in an open position.

FIG. 8 is a diagrammatic wiring diagram of a motorcycle or the like equipped with a self-cancelling turn signal embodying the features of the present invention. As shown in FIG. 8, the system includes front and rear left turn signal lights 74, front and rear right turn signal lights 76, a battery 78, and flasher 80. Of course, the power supply, shown as a battery 78 also normally includes a generator, alternator, or the like, when the motorcycle is in operation. The operation of the turn signal system of the present invention is best described in connection with FIG. 8.

Assuming that the operator of the motorcycle desires to make a right turn, he moves the knurled knob 18 (see FIG. 3) in a right-hand direction, causing the sliding member 26 to move to the right, so that the cam follower 30 engages the left-hand cammed detent 28a. Such movement causes the right leaf 42b to engage its associated contact 44, as shown in FIG. 4. As can be seen in FIG. 8, this completes circuit between the battery 78 and the right turn signal lights 76 through the flasher 80.

As the motorcycle emerges from the turn, the rider will ordinarily upshift by pressing upwardly on the toe-contact portion 52 of the gearshift lever 50, thus causing the contact strip 58 to be grounded, activating the electromagnet 40. Again, as can be seen in FIG. 8, this completes a circuit which activates the electromagnet 40, moving the lever 34 into contact with the electromagnet 40, so that the sliding member 26 is returned to its center position by the coil springs 32.

Of course, the turn signal of the present invention can also be manually cancelled in the event that no upshift is used, as may be the case, for example, when changing lanes on an expressway. Manual cancellation is accomplished by simply moving the thumb-operated lever 16 to its center position.

As can be appreciated from the foregoing description of the invention, the turn signal cancelling device of the present invention, while particularly adapted to motorcycles, can also be used in other types of vehicles. The particular switching means shown are not the only means that can be used, and, for example, the electromagnet 40 could be wired directly to a second switch means in the transmission, so that the present invention could even operate in connection with an automatic transmission having two or more speeds.

Obviously, many modifications and variations of the invention as hereinbefore set forth will occur to those skilled in the art, and it is intended to cover in the appended claims all such modifications and variations as fall within the true spirit and scope of the invention.

I claim:

1. An automatically cancelling turn signal for a motorcycle or the like having a transmission with at least two forward speeds together with shift control means for shifting said transmission comprising: left and right turn indicator lights mounted on said motorcycle; first switch means for selectively manually activating said lights; and inactivating means including second switch means operatively connected to said shift control means for inactivating said lights responsive to the operation of said shift control means when said transmission is shifted from a lower gear to a higher gear.

2. The device as described in claim 1 wherein said first switch means comprises a movable member having a cammed detent means defining a left signalling position, a right signalling position, and an off position therebetween; biasing means normally biasing said member toward said off position; a cam follower engaging said detent means for holding said member in either of said signalling positions, and wherein said inactivating means comprises cam follower disengagement means for disengaging said cam follower from said detent means responsive to said shifting, whereby to permit said biasing means to return said member to said off position.

3. The device as defined in claim 2 further comprising cam follower biasing means biasing said cam follower toward said detent means, and wherein said cam follower disengagement means comprises an electromagnet operatively connected to disengage said cam follower from said detent means.

4. The device as defined in claim 3 further comprising means in said switch means for simultaneously activating said left and right turn indicator lights.

5. An automatically cancelling turn signal for motorcycles and the like having a transmission with at least two forward speeds together with a foot-operated gearshift lever comprising: left and right turn indicator lights mounted on said motorcycle; first switch means for selectively manually activating said lights; and inactivating means including second switch means operatively connected to said gearshift lever for inactivating said lights responsive to the movement of said gearshift lever in an upshift direction.

6. The device as defined in claim 5 wherein said second switch means comprises a switch in said gearshift lever which is closed responsive to foot pressure on said gear shifting lever in an upshift direction.

7. The device as defined in claim 5 wherein said first switch means comprises a movable member having cammed detent means defining a left signalling position, at right signalling position, and an off position therebetween; biasing means biasing said member toward said off position; a cam follower engaging said detent means for holding said member in either of said signalling positions; and wherein said inactivating means comprises cam follower disengagement means for disengaging said cam follower from said detent means responsive to the operation of said second switch means, whereby to permit biasing means to return said member to said off position.

8. The device as defined in claim 7 further comprising cam follower biasing means biasing said cam follower toward said detent means, and wherein said cam follower disengagement means comprises an electromagnet operatively connected to disengage said cam follower from said detent means.

9. The device as defined in claim 8 wherein said second switch means comprises a switch in said gear shifting lever operated responsive to foot pressure in an upshift direction to close a circuit and to activate said electromagnet.

10. The device as defined in claim 9 further comprising means in said switch means for simultaneously activating said left and right turn indicator lights.

11. An automatically cancelling turn signal for motorcycles and the like having a foot-operated gear shifting lever comprising: left and right turn indicator lights; slide-type switch means including a sliding member having cammed detent means defining left, center, and right positions for said sliding member; biasing means biasing said sliding member towards said center position; a cam follower engaging said detent means for holding said sliding member in any of said positions; cam follower biasing means biasing said cam follower toward said detent means; cam follower disengagement means comprising an electromagnet operatively connected to disengage said cam follower from said detent means; and switch means in said gearshift lever for activating said electromagnet responsive to foot pressure in an upshift direction.

12. A turn signal system for motorcycles and the like comprising: left and right turn indicator lights; slide-type switch means for selectively manually activating said lights, said switch means having a sliding member which is slidable in a generally horizontal direction between left, center, and right positions and rotatable about its horizontal axis, said sliding member including cammed detents and having a cammed surface projecting radially outwardly from said axis; a pair of leaf switch means and a pair of electrical contact means, one of said leaf switch means being forced into engagement with one of said contacts when sliding member is moved to said left position, and the other of said leaf switch means being forced into engagement with the other of said contacts when said sliding member is moved to said right position, and said leaf switch means being forced into simultaneous engagement with both of said contacts by said radially outwardly projecting cammed surface when said sliding member is rotated about said axis; and means for activating said left and right turn indicator lights respectively in response to said leaf switch means being forced into engagement with said left and right contacts; lever means affixed to said sliding member for moving said sliding member along said horizontal axis and for rotating said sliding member about said axis.

13. The device as defined in claim 12 further comprising cammed detent means in said sliding member corresponding to said left, center, and right positions; biasing means biasing said member toward said center position; and a cam follower engaging said detent means for holding said sliding member in any one of said positions.

14. The device as defined in claim 13 further comprising cam follower means biasing said cam follower toward said detent means; and an electromagnet operatively connected to disengage said cam follower from said detent means.

15. On a motorcycle having a transmission as part of a drive train between an engine and a driving wheel, said transmission being shiftable between gears in both up and down directions, right and left turn indicators and first means for manually initiating said right and left signals, the improvement comprising second means responsive to a shifting of said transmission into a higher gear for cancelling said turn indicator until again manually initiated.

* * * * *